(No Model.)

G. E. HATCH.
Glass Water Closet Bowl.

No. 243,447. Patented June 28, 1881.

Witnesses:
J. N. Shumway
L. D. Rogers

George E. Hatch
Inventor
By atty
John E. Earle

N. PETERS, Photo-Lithographer, Washington, D. C.

UNITED STATES PATENT OFFICE.

GEORGE E. HATCH, OF MERIDEN, CONNECTICUT.

GLASS WATER-CLOSET BOWL.

SPECIFICATION forming part of Letters Patent No. 243,447, dated June 28, 1881.

Application filed March 21, 1881. (No model.)

*To all whom it may concern:*

Be it known that I, GEORGE E. HATCH, of Meriden, in the county of New Haven and State of Connecticut, have invented a new Improvement in the Manufacture of Glass Water-Closet Bowls; and I do hereby declare the following, when taken in connection with the accompanying drawings and the letters of reference marked thereon, to be a full, clear, and exact description of the same, and which said drawings constitute part of this specification, and represent, in—

Figure 1:
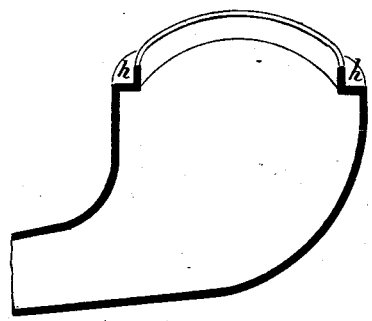
Figure 2:
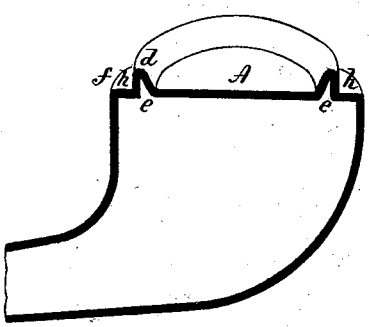
Figure 3:
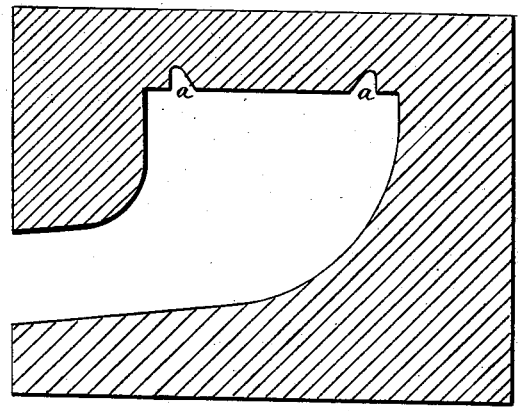

Figure 1, a vertical central section; Fig. 2, a vertical central section illustrating the method of manufacture; Fig. 3, a vertical section of the mold.

This invention relates to an improvement in the method of making water-closet bowls, having for its object the making of the bowls from glass.

Attempts have been made to blow these closet-bowls, but up to my invention without success.

My invention consists in blowing the glass in a mold from the small or discharge end, closing the upper end solid, but forming therein an upwardly-projecting hollow flange corresponding to the edge of the upper opening as it is to be, then grinding off the upper edge of the flange down into the hollow space within, whereby the central part is separated from the body and leaves the upper opening surrounded by the requisite vertical flange.

The mold, Fig. 3, is constructed in shape to correspond to the exterior of the bowl, and with a cavity, $a$, at the top to receive the glass to form the flange, this cavity having its outer side vertical, or nearly so, its inner side inclined therefrom, as shown. The glass is introduced into the mold and blown in the usual manner, filling the entire mold and forcing the glass into the cavity $a$, and so as to leave a corresponding cavity, $e$, on the inside, as seen in Fig. 2. This will of course leave the top entirely closed. To open the top the edge of the upwardly-projecting part $d$, formed in the cavity $a$, is ground off, say as upon the line $f$, Fig. 2, and so as to cut down into the cavity $e$ upon the inside, which separates the part A from the edge, leaving the required upwardly-projecting flange $h$, as seen in Fig. 1, around the opening in the top of the bowl.

By this method of construction I am enabled to make a complete and perfect bowl of glass very much stronger than porcelain and less liable to breakage, and also without the irregularities in shape and condition which unavoidably follow the baking of the earthen or porcelain bowls.

I am aware that water-closet bowls have been made from porcelain; but I am not aware that prior to my invention water-closet bowls have been made from glass.

The great advantage of glass water-closet bowls over porcelain exists in the fact, first, that the glass is very much stronger than the porcelain can be made, hence not liable to the accidents which destroy the porcelain bowls; second, it is impossible to make porcelain so that it will not absorb more or less, particularly around the exposed edges, which it is difficult, if not impossible, to glaze or protect; third, from such absorption discoloration follows, whereas a glass bowl cannot absorb in the slightest degree, neither can it become discolored from any use.

I do not broadly claim blowing articles from glass in molds and then removing a portion to produce an opening, as such, I am aware, is not new. Neither do I broadly claim a glass water-closet bowl, as I am aware that it is not new, (see English Patents 12,465 of 1849 and 2,674 of 1853;) but I am not aware that a water-closet bowl had been made from glass blown in a mold prior to my invention.

I claim—

1. The method herein described of making water-closet bowls from glass, consisting in blowing the glass in a mold constructed with a cavity around the top corresponding to the flange required around the opening, but broader than that flange, so that the glass will enter said cavity and form a corresponding cavity upon the reverse or inside of the top, then cutting away the upper edge of the flange-projection into the cavity upon the inside, so as to separate the central part and form the upper opening, substantially as described.

2. As a new article of manufacture, the herein-described water-closet bowl as made from glass blown in a mold, substantially as described.

GEO. E. HATCH.

Witnesses:
JNO. M. BLACKBURN,
I. C. LYON, Jr.